(12) United States Patent
Harada et al.

(10) Patent No.: US 7,023,143 B2
(45) Date of Patent: Apr. 4, 2006

(54) BALLAST APPARATUS AND BALLASTING METHOD OF HIGH INTENSITY DISCHARGE LAMP

(75) Inventors: Shigeki Harada, Tokyo (JP); Kikuo Izumi, Tokyo (JP); Takahiro Urakabe, Tokyo (JP); Akihiron Suzuki, Tokyo (JP); Akihiko Iwata, Tokyo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/851,184

(22) Filed: May 24, 2004

(65) Prior Publication Data

US 2004/0251849 A1    Dec. 16, 2004

(30) Foreign Application Priority Data

May 26, 2003    (JP)    ............................. 2003-147991

(51) Int. Cl.
*H05B 37/02*    (2006.01)
(52) U.S. Cl. .................... 315/209 R; 315/291; 315/224
(58) Field of Classification Search ............ 315/209 R, 315/224, 291, 276, 282, 219
See application file for complete search history.

(56) References Cited

U.S. PATENT DOCUMENTS

| 4,724,361 | A | 2/1988 | Wada et al. ................. 315/246 |
|---|---|---|---|
| 5,121,034 | A | 6/1992 | Allen et al. .................. 315/246 |
| 5,773,937 | A | 6/1998 | Miyazaki et al. ........... 315/246 |
| 6,445,141 | B1 * | 9/2002 | Kastner et al. .............. 315/307 |
| 6,548,966 | B1 | 4/2003 | Kawasaka et al. .......... 315/291 |
| 6,936,974 | B1 * | 8/2005 | Melis ...................... 315/209 R |
| 6,975,077 | B1 * | 12/2005 | Izumi et al. ............. 315/209 R |

FOREIGN PATENT DOCUMENTS

JP    07-211472    8/1995

OTHER PUBLICATIONS

Yoshikawa et al., "New Method for Reducing Arc Instability of HID Lamps on High Frequency Operation", *J. Illum. Engng. Inst. Jpn,*, 1993, vol. 77, No. 10, pp. 619-626.

* cited by examiner

*Primary Examiner*—Trinh V Dinh
*Assistant Examiner*—Jimmy Vu
(74) *Attorney, Agent, or Firm*—Leydig, Voit & Mayer, Ltd.

(57) ABSTRACT

A ballast for a vehicle metal halide lamp is simplified using a DC-AC one-step-boost high frequency ballast system. To satisfy requirements specific to a metal halide lamp, a discharge developing capacitor is installed on a primary side of a transformer in parallel with a DC power supply, ensuring discharge development after a breakdown. To reduce the size and increase the operating voltage of the transformer, a booster circuit and voltage-doubler circuit are installed on the primary side and secondary side of the transformer, respectively. To reduce the size of the transformer and achieve a stable discharge, the ballast frequency is swept within a range between the specified minimum frequency and maximum frequency so that the center frequency is from 80 kHz to 120 kHz, and the same frequency is unsustained for more than 10 msec.

12 Claims, 8 Drawing Sheets

SHAPE OF ARC DISCHARGE

BALLAST APPARATUS AND BALLASTING METHOD OF HIGH INTENSITY DISCHARGE LAMP

BACKGROUND OF THE INVENTION

1. Field of the Invention

The present invention relates to a ballast apparatus and ballasting method of a high intensity discharge lamp, such as a metal halide lamp, used as the light source of the headlights of an automobile or the like.

2. Description of Related Art

Recently, metal halide lamps have been used as the headlights of an automobile instead of halogen lamps. The metal halide lamp, one of the HID (High Intensity Discharge) lamp, is characterized by its high luminous efficiency, high color temperature and long life compared with the halogen lamp.

The arc tube of the metal halide lamp contains metal halides which are mixtures of some metals such as sodium and scandium with halogen such as iodine, high pressure xenon serving as a starting gas, and mercury. The metal halide lamp starts emitting light as follows. First, it starts discharge of the xenon in a gaseous condition at room temperature, followed by arc discharge of the xenon, which increases the temperature inside the arc tube. As the temperature in the tube increases, the mercury vaporizes and starts arc discharge, thereby further increasing the temperature in the tube. A further increase in the temperature in the tube brings about the evaporation of the metal halides, followed by their arc discharge, thereby achieving the high color temperature emission at high luminous efficiency. Incidentally, although the mercury serves as a stopgap of the discharge between the xenon and metal halides, metal halide lamps without containing the mercury have been provided recently.

Thus, it is necessary for the ballast apparatus of the metal halide lamp to sequentially discharge the variety of the substances to keep the discharge. In other words, it must control the discharge in response to the variable load characteristics of the lamp.

Consequently, the ballast circuit of the metal halide lamp must meet singular requirements which differ greatly from the requirements for the ballast circuit of fluorescent lamps (low-pressure mercury vaporization discharge lamps) widely used as normal household lighting and backlights of liquid crystal displays.

As the ballast apparatus of vehicle headlights using the metal halide lamps, which satisfies the foregoing requirements, the technique disclosed in Relevant Reference 1 is known. In the present specification, the circuit configuration described in Relevant Reference 1 is called "full-bridge, low-frequency ballast system".

Although the full-bridge, low-frequency ballast system can meet the requirements necessary for the metal halide lamp and implement a rather compact and inexpensive ballast apparatus, further reduction in the size and cost is required.

On the other hand, as for the ballast apparatuses of fluorescent lamps used as the backlights of liquid-crystal displays, a thoroughgoing reduction of their size and cost has been carried out. As a result, the methods have been widely used which convert voltages fed from DC power supplies to AC waves using push-pull DC-AC inverters to light the lamps at high frequencies. As an example of such methods, a ballast circuit described in Relevant Reference 2 is known. In the present specification, the circuit configuration disclosed in the Relevant Reference 2 is called "DC-AC one-step-boost high frequency ballast system" from its circuit characteristics.

The DC-AC one-step-boost high frequency ballast system carries out the power conversion from DC to AC only once within the ballast circuit using a push-pull DC-AC inverter. Thus, it can simplify the circuit configuration, and miniaturize its transformer occupying a large portion of the total volume of the apparatus because of the high frequency turn-on, thereby being able to achieve the reduction in size and cost of the ballast apparatus. To apply the circuit scheme to the ballast apparatus of the metal halide lamp, the singular requirements of the metal halide lamp must be met, which prevents the implementation thereof.

Relevant Reference 1: Japanese patent application laid-open No. 2002-352989.

Relevant Reference 2: Japanese patent application laid-open No. 7-211472/1995.

The full-bridge, low-frequency ballast system described above has its discharge developing capacitor connected in parallel with the secondary output of the transformer for generating a high voltage. Accordingly, it requires a capacitor with a high withstand voltage, hindering the reduction in cost and size of the high intensity discharge lamp ballast apparatus.

In addition, the full-bridge, low-frequency ballast system separates its DC-DC converter for boosting from the inverter for converting into AC to satisfy both the requirements to reduce the size of the transformer and to stabilize the lamp. Thus, it requires the multi-stage conversion, which increases the number of the circuit components, and prevents the reduction in size and cost of the high intensity discharge lamp ballast apparatus.

Furthermore, to satisfy the requirements to start the metal halide lamp, it is necessary to generate a high voltage pulse of about 20 kV or more across the lamp to cause breakdown in a hot condition during a discharge start period. However, it is necessary for the circuit using the DC-AC one-step-boost high frequency ballast system to increase the number of turns of the inverter transformer to boost to the high voltage. This increases the size of the transformer, hampering the reduction in size and cost of the high intensity discharge lamp ballast apparatus.

Moreover, the circuit using the DC-AC one-step-boost high frequency ballast system employs the same frequency for driving the transformer and for turn-on the lamp. As a result, to turn on the lamp at a low-frequency to stabilize the discharge, the size of the transformer increases, which prevents the reduction in size and cost of the high intensity discharge lamp ballast apparatus.

SUMMARY OF THE INVENTION

The present invention is implemented to solve the foregoing problems. It is therefore an object of the present invention to provide a compact, inexpensive ballast apparatus and method of a high intensity discharge lamp capable of turning on the metal halide lamp normally using a DC-AC one-step-boost high frequency ballast system.

According to a first aspect of the present invention, there is provided a high intensity discharge lamp ballast apparatus including: a plurality of power supplies and a plurality of switching elements provided on the primary side of a transformer; and a control circuit for turning the plurality of switching elements on and off repeatedly to generate, on a secondary side of the transformer, an AC voltage that is higher in voltage and frequency than a primary side voltage of the transformer.

Since it can supply sufficient energy to the HID lamp during the discharge developing period, it can simplify the circuit configuration, thereby offering an advantage of being able to reduce its size and cost.

According to a second aspect of the present invention, there is provided a high intensity discharge lamp ballast method including the step of: driving, during at least one of a discharge transient period and a normal discharge period after a breakdown, a high intensity discharge lamp by a driving voltage undergoing frequency modulation with a center frequency in a range from 80 kHz to 120 kHz.

According to a third aspect of the present invention, there is provided a high intensity discharge lamp ballast method including the steps of: obtaining a desired voltage across a discharge developing capacitor connected in parallel with a DC power supply provided on a primary side of a transformer by charging the discharge developing capacitor; charging a gap switch activating capacitor connected to a secondary side of the transformer up to a turn-on voltage of a gap switch by repeatedly turning on and off a plurality of switching elements provided on the primary side of the transformer; generating a breakdown in a high intensity discharge lamp by supplying the high intensity discharge lamp with a counter electromotive force of a pulse voltage generated by turning on the gap switch; starting up luminous flux quickly after the breakdown by increasing power to be supplied to the high intensity discharge lamp beyond rated power by applying energy from the discharge developing capacitor to the high intensity discharge lamp, and by controlling a duty factor of waveforms for driving the switching elements; and maintaining power to be supplied to the high intensity discharge lamp at the rated power after the start-up of the luminous flux by controlling the duty factor of the waveforms for driving the switching elements.

It offers an advantage of being able to implement the stable turn-on of the HID lamp.

DETAILED DESCRIPTION OF THE PREFERRED EMBODIMENTS

The embodiments of the high intensity discharge lamp ballast apparatus in accordance with the present invention will now be described with reference to the accompanying drawings.

First, four phases necessary for turning on the metal halide lamp of a vehicle will be described. Phases A, B and C in the following description correspond to A, B and C of FIG. 2, and the symbol O in FIG. 2 designates a discharge waiting period, which will be described in detail later.

A. Discharge Start Period

The load condition of the lamp before the discharge start period differs depending on the elapsed time from the end of the previous discharge. When a sufficient time has elapsed from the end of the previous discharge, and the temperature in the tube drops to near the room temperature, and the breakdown voltage is low when the pressure in the tube is low. This state is called a "cold condition". In contrast with this, when a sufficient time has not elapsed from the end of the previous discharge, and the temperature in the tube is still high, the pressure in the tube is still high, and the breakdown voltage is higher than that of the cold condition. This state is called a "hot condition". In the discharge start period, it is necessary to apply a high voltage of a few tens of kilovolts to positively generate the breakdown even in the hot condition in which the breakdown voltage is high.

B(B-1). Discharge Developing Period

Before the breakdown, the resistance of the lamp is large, several megohms. After the breakdown, the resistance of the lamp sharply drops to a few tens of ohms once, and then increases to a steady state of a few hundred ohms with an increase of the temperature and pressure in the tube. In the volume process of the discharge, unless sufficient energy for sustaining the discharge is supplied in response to the sharp reduction of the lamp resistance, the discharge becomes unstable and can be extinguished. Furthermore, in the cathode surface process of the discharge, sufficient energy must be supplied to emit thermoelectrons to continue the arc discharge. Accordingly, it is necessary to supply sufficient energy immediately after the breakdown to prevent the discharge from going out.

B(B-2). Luminous Flux Start-Up Period

The headlamps of the vehicle must produce a desired luminous flux in a specified time period. To achieve this, the lamp must be supplied in a short time with sufficient energy such as 70 W, which is greater than the rated power of 35 W during the normal discharge period, thereby starting up the luminous flux quickly.

B. Transient Discharge Period

The discharge developing period of B-1 and the luminous flux start-up period of B-2 cannot be definitely divided in time, and are referred to as B. transient discharge period generically. During the transient discharge period, since the lamp load after the breakdown is different in the hot condition and cold condition, the energy to be supplied must be adjusted depending on the hot condition or cold condition. More specifically, in the hot condition, the lamp resistance after the breakdown is higher, and increases to the steady state resistance in shorter duration, thereby reaching the desired luminous flux in a shorter time. Accordingly, excessive energy is supplied if the same energy is supplied in the hot condition as in the cold condition for implementing the discharge development and luminous flux start-up, which will reduce the life of the lamp. Reversely, the discharge will be extinguished or the desired luminous flux is delayed unless sufficient energy is supplied in the cold condition to carry out the discharge development and luminous flux start-up.

C. Normal Discharge Period

During the normal lighting by the arc discharge of the metal halides, the rated power must be maintained at 35 W, and the stable discharge must be sustained. As for the metal halide lamp, since the ballast frequency is the most important factor, it is necessary to select a suitable frequency to prevent unstable discharge due to acoustic resonance, which will be described later.

The embodiments will be described considering the four phases necessary for the turn-on of the foregoing metal halide lamp for the vehicle.

EMBODIMENT 1

Figure 1:
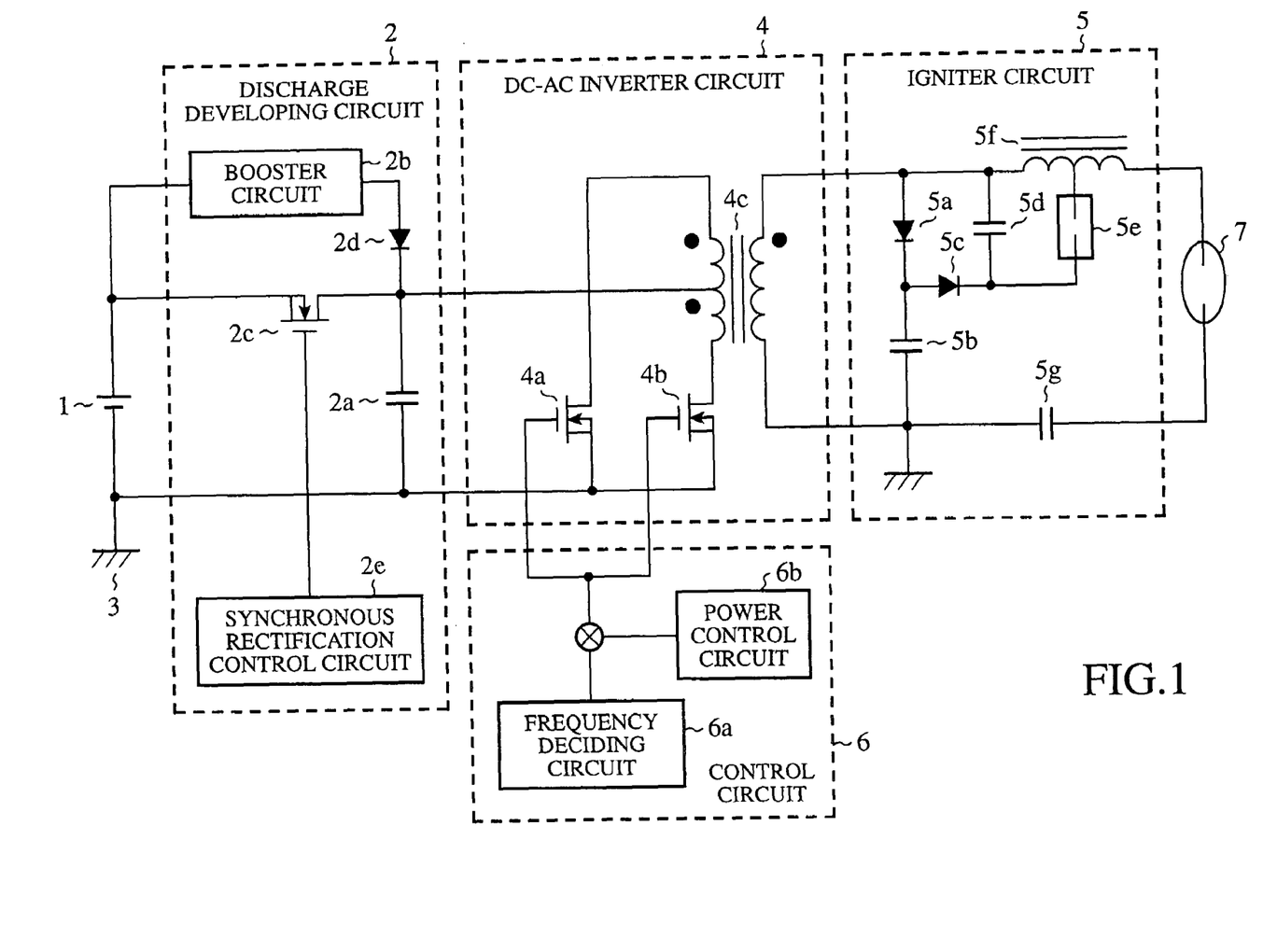
FIG. 1 is a circuit diagram showing a configuration of an embodiment 1 of the high intensity discharge lamp ballast apparatus in accordance with the present invention.

The embodiment 1 will be described with reference to FIGS. 1–7. FIG. 1 is a circuit diagram showing the embodiment 1 of the high intensity discharge lamp ballast apparatus in accordance with the present invention.

As shown in FIG. 1, the high intensity discharge lamp ballast apparatus includes a DC power supply 1, a discharge developing circuit 2, a DC-AC inverter circuit 4, an igniter circuit 5, and a control circuit 6, and turns on the metal halide lamp 7.

The DC power supply 1 generates a 12 V DC voltage, and supplies it to the discharge developing circuit 2. The minus potential side is connected to a ground line 3.

The discharge developing circuit 2 is provided to supply the HID lamp with sufficient energy during the discharge developing period. It includes a discharge developing capacitor 2a, a booster circuit 2b, a synchronous rectification switching element 2c, a reverse blocking diode 2d, and a synchronous rectification control circuit 2e. The booster circuit 2b increases the voltage across the discharge developing capacitor 2a beyond the voltage of the DC power supply 1. The synchronous rectification switching element 2c serves to prevent the current from flowing back from the discharge developing capacitor 2a toward the DC power supply 1 before the start of the discharge, and to cause the current from the DC power supply 1 to flow at a low loss during the normal discharge period. The reverse blocking diode 2d prevents the current from flowing back from the discharge developing capacitor 2a toward the DC power supply 1. The synchronous rectification control circuit 2e controls the switching element 2c.

The DC-AC inverter circuit 4 serves to convert the voltage of the DC power supply 1 or the voltage across the discharge developing capacitor 2a into an AC voltage after increasing their voltages. It includes switching elements 4a and 4b constituting a half-bridge, and a transformer 4c for a push-pull operation.

The igniter circuit 5 is provided to generate the high voltage pulse to cause the breakdown during the discharge start period. It includes a diode 5a, a capacitor 5b, a diode 5c, a gap switch activating capacitor 5d, a gap switch 5e, an ignition transformer 5f, and a capacitor 5g for producing resonance with the inductance of the transformer 5f. The diode 5a, capacitor 5b, diode 5c, and the gap switch activating capacitor 5d constitute a voltage-doubler circuit for increasing the voltage output from the secondary side of the transformer 4c.

The control circuit 6 is provided to modify the ballast waveform in accordance with the object. It includes a frequency deciding circuit 6a for determining the frequency of a fundamental ballast waveform, and a power control circuit 6b for controlling the power by adjusting the duty factor by detecting the voltage or current.

Figure 2:
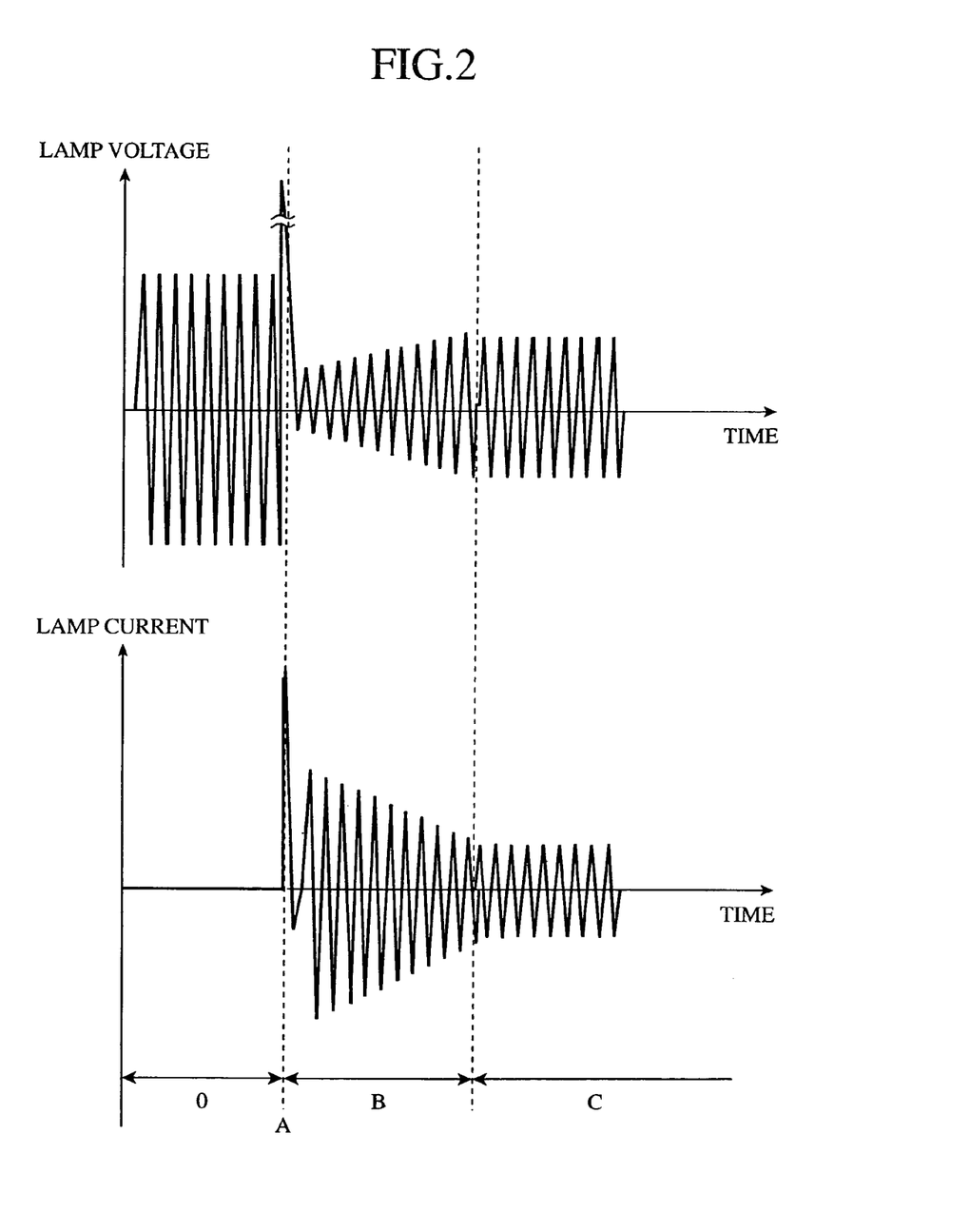
FIG. 2 is a diagram illustrating waveforms of the voltage and current of the lamp at the turn-on of the embodiment 1 of the high intensity discharge lamp ballast apparatus in accordance with the present invention.

Next, the operation of the high intensity discharge lamp ballast apparatus will be described considering the conditions required to turn on the vehicle metal halide lamp with reference to FIG. 2.

O. Discharge Waiting Period

When a lighting switch not shown is turned on, the control circuit 6 supplies the switching elements 4a and 4b with a gate signal. Thus, the switching elements 4a and 4b turns on and off repeatedly, thereby generating a voltage increased by a factor of the turn ratio of the transformer 4c at its secondary side. In this case, to achieve the miniaturization of the transformer 4c, the driving frequency of the switching elements 4a and 4b in the DC-AC inverter is preferably about 100 kHz. Since the present embodiment utilizes the DC-AC one-step-boost high frequency ballast system, it can eliminate the high frequency switch for the DC-DC converter that is required by the conventional apparatuses. Thus, the capacity of radiating heat generated by the high frequency switch is applicable to the radiation of the heat generated by the switches of the inverter. As a result, the more efficacy high frequency operation of the inverter is possible.

When the lighting switch is turned on, the booster circuit 2b also starts its operation so that it increases the voltage of the DC power supply 1, and starts charging the discharge developing capacitor 2a. Even if the potential of the discharge developing capacitor 2a becomes higher than that of the power supply, since the synchronous rectification switching element 2c is non-conducting, it can prevent the backflow of the current. Although the synchronous rectification switching element 2c is used to prevent the backflow of the current in FIG. 1, a diode can also be used in order to reduce the cost and size. However, it must be considered that the diode increases the loss because its on-resistance is greater than that of the switching element.

Next, the description is made using a concrete example of the voltages. Supposing the battery of the vehicle, the voltage of the DC power supply 1 is assumed to be 12 V. When the booster circuit 2b doubles the voltage, the discharge developing capacitor 2a is charged to 24 V. Accordingly, the primary side of the transformer 4c is supplied with the voltage of 24 V. When the turn ratio of the transformer 4c is 1:17, the secondary side of the transformer produces a voltage of about 400 V.

At the secondary side, a voltage multiplier circuit is used to boost the voltage. When the output of the transformer 4c is positive (the upper side is positive in FIG. 1), the capacitor 5b is charged through the diode 5a. Subsequently, when the output of the transformer 4c is reversed to negative (the upper side is negative in FIG. 1), the discharge current from the capacitor 5b charges the gap switch activating capacitor 5d. In this case, since the output of the transformer 4c is negative, about 800 V, double the output voltage of the transformer 4c, is generated across the gap switch activating capacitor 5d, so that the voltage of about 800 V is applied to the gap switch 5e.

A. Discharge Start Period

When the turn-on voltage of the gap switch 5e is about 800 V, the gap switch 5e is turned on when the voltage across the gap switch activating capacitor 5d becomes about 800 V. Thus, the pulse current flows through the primary winding of the transformer 5f so that the high voltage of about 20 kV is generated across the secondary winding, and is applied to the electrodes at both ends of the lamp 7. Since the voltage exceeds the discharge start voltage of the cold condition and hot condition, it brings about the breakdown.

The process of the boost from the battery voltage to the turn-on voltage of the gap switch 5e is summarized as follows. The 12 V, the voltage of the battery constituting the DC power supply 1, is doubled to 24 V by the booster circuit 2b. The voltage 24 V charges the discharge developing capacitor 2a, and is boosted to about 400 V by the transformer 4c. The voltage 400 V is doubled to about 800 V by the voltage-doubler circuit so that the voltage of about 800 V is supplied across the gap switch 5e.

The reason for boosting the voltage via the foregoing three steps is as follows. In the ballast process of the HID lamp, the turn-on voltage of the gap switch 5e is required only for the breakdown. During the continuous discharge after the breakdown, the voltage of about 85 V is sufficient if enough power can be supplied. Consequently, from the viewpoint of reducing the size of the transformer 4c, the boosting by the transformer 4c is limited to a low value to make the turn ratio as small as possible. Then, the voltage required for the breakdown is produced by the boost by the booster circuit 2b on the primary side or by the voltage-doubler circuit on the secondary side. After the breakdown, the boosting by the booster circuit 2b on the primary side is stopped. Thus, the gap switch 5e is not turned on after the breakdown. Although the boosting rate of the booster circuit 2b on the primary side and that of the voltage-doubler circuit on the secondary are both assumed to be two, they can be assigned different values considering the withstand voltage and volume of the elements or the like.

B(B-1). Discharge Developing Period

Once the breakdown occurs and the current flows through the lamp 7, the voltage across the electrodes of the lamp drops sharply. In this case, the switching elements 4a and 4b continue turning on and off repeatedly from the previous discharge waiting period. Accordingly, the energy fed from the DC power supply 1 and the energy stored in the discharge developing capacitor 2a which is charged during the discharge waiting period are supplied to the lamp as the discharge development energy, thereby developing the discharge and preventing the discontinuation of the discharge. The capacity of the discharge developing capacitor 2a is set at such a value that can supply sufficient energy to maintain and develop the discharge immediately after the breakdown. In addition, since the discharge developing capacitor 2a is connected to the primary side of the transformer, its withstand voltage can be low, thereby being able to reduce the size and cost of the ballast apparatus.

B(B-2). Luminous Flux Start-Up Period

Even after the discharge developing period, the switching elements 4a and 4b repeat turning on and off to supply power to the secondary side. When the lamp 7 is in the cold condition, the power control circuit 6b supplies power such as 70 W greater than the rated power of 35 W, thereby starting up the desired luminous flux in a shorter time. The control of the power is carried out by varying the duty factor of the switching elements 4a and 4b. In the hot condition, this period is skipped so that the control is shifted to the next normal discharge period.

C. Normal Discharge Period

After the luminous flux starts up, the power control enters into the normal discharge period. The power control circuit 6b controls the duty factor of the switching elements 4a and 4b to repeat the discharge at the rated power of 35 W. During the normal discharge, the power control circuit 6b carries out the ballast drive of the switching elements using waveforms with a frequency sweep scheme whose frequency is modulated, in order to avoid the unstable discharge due to the acoustic resonance. For example, the ballast drive is carried out by the waveforms with a center frequency of 90 kHz, a modulation frequency of 1 kHz, a minimum frequency of 80 kHz, and a maximum frequency of 100 kHz. The power control circuit 6b carries out the ballast drive continuously from the start of the discharge waiting period to the end of the lighting using the frequency swept waveforms.

Next, the frequency sweep scheme for avoiding the acoustic resonance will be described in more detail. The number of turns of the primary winding which decides the volume of the transformer is inversely proportional to the frequency, and hence becomes small as the frequency increases. Consequently, increasing the frequency enables the miniaturization of the transformer. On the other hand, the core loss of the transformer increases with an increase of the frequency, thereby raising the temperature. Considering the relationships, the inventors of the present application have reached a conclusion that the optimum frequency for designing the transformer of the ballast circuit of the vehicle is about 100 kHz. This is also supported by the fact that the transformer of the DC-DC converter of the circuit disclosed by the Relevant Reference 1 is driven at the frequency of 100 kHz, addis successfully miniaturized to be actually used by the present vehicles.

However, to turn on the metal halide lamp at a high frequency above several kilohertz, the acoustic resonance occurs which can bring about the unstable discharge or extinguish the discharge. The details of the acoustic resonance are reported in the Journal of the Illuminating Engineering Institute of Japan Vol. 77, No. 10, 1993, pp. 29–36 (abbreviated to IEIJ paper from now on).

The IEIJ paper describes the mechanism of the instability of the arc discharge due to the acoustic resonance as follows. The progressive waves in the reflection directions of each other within the lamp produce a standing wave. The frequency of the standing wave approaches the natural frequency of the lamp so that the standing wave begins to resonate. The standing wave is a compression wave of the mercury vapor dominating the lamp during lighting. The standing wave refers to a wave with the pressure distribution invariable in time, and brings about nonuniform pressure distribution within the lamp according to its shape. In the pressure distribution, the arc discharge is formed such that the energy condition becomes minimum, thereby bending the arc.

Besides the IEIJ paper, there are a lot of papers and patents describing the acoustic resonance. Some of them assume theoretical equations and obtain the frequency at which the acoustic resonance occurs, the frequency at which it does not occur, or the frequency at which the arc becomes straight and the discharge becomes stable in spite of the occurrence of the acoustic resonance. However, the frequencies obtained using the equations disclosed in the IEIJ paper or in Japanese patent No. 3189609 are not necessarily consistent with the frequencies obtained by experiments.

In other words, it is difficult to obtain the frequency that can stabilize the discharge from a theoretical equation when driving the HID at the high frequency. In addition, it is impossible to decide as to whether the methods proposed so far are effective or not theoretically. Accordingly, as things stand now, to design the ballast circuit, only experiment can specify the frequency region.

As an example of clearly showing experimental results, there is a ballast method disclosed in Japanese patent application publication No. 7-66866/1995 (U.S. Pat. No. 5,121,034). It utilizes the frequency sweep ballast method that performs frequency modulation of the ballast frequency as a method to avoid the unstable discharge due to the acoustic resonance. Although the technique itself of circumventing the unstable discharge due to the acoustic resonance by the frequency sweep ballast method is know as disclosed in the foregoing IEIJ paper or Japanese patent application laid-open No. 61-165999/1986, Japanese patent application publication No. 7-66866/1995 is granted a patent by limiting the center frequency of the frequency swept waveform to the range from 20 kHz to 80 kHz by showing experimental results.

However, Japanese patent application publication No. 7-66866/1995 has no region that can achieve stable discharge in the frequency band above 50 kHz, and shows no experimental results as to the turn-on above 80 kHz. For the reasons described above, it is impossible to speculate the phenomenon above 80 kHz from the experimental results in the range from 20 kHz to 80 kHz.

In such a background of the technology, the inventors of the present invention experimentally found conditions to achieve a sufficiently wide stable frequency band near 100 kHz using the frequency sweep ballast system, which will be described below.

Figure 3:
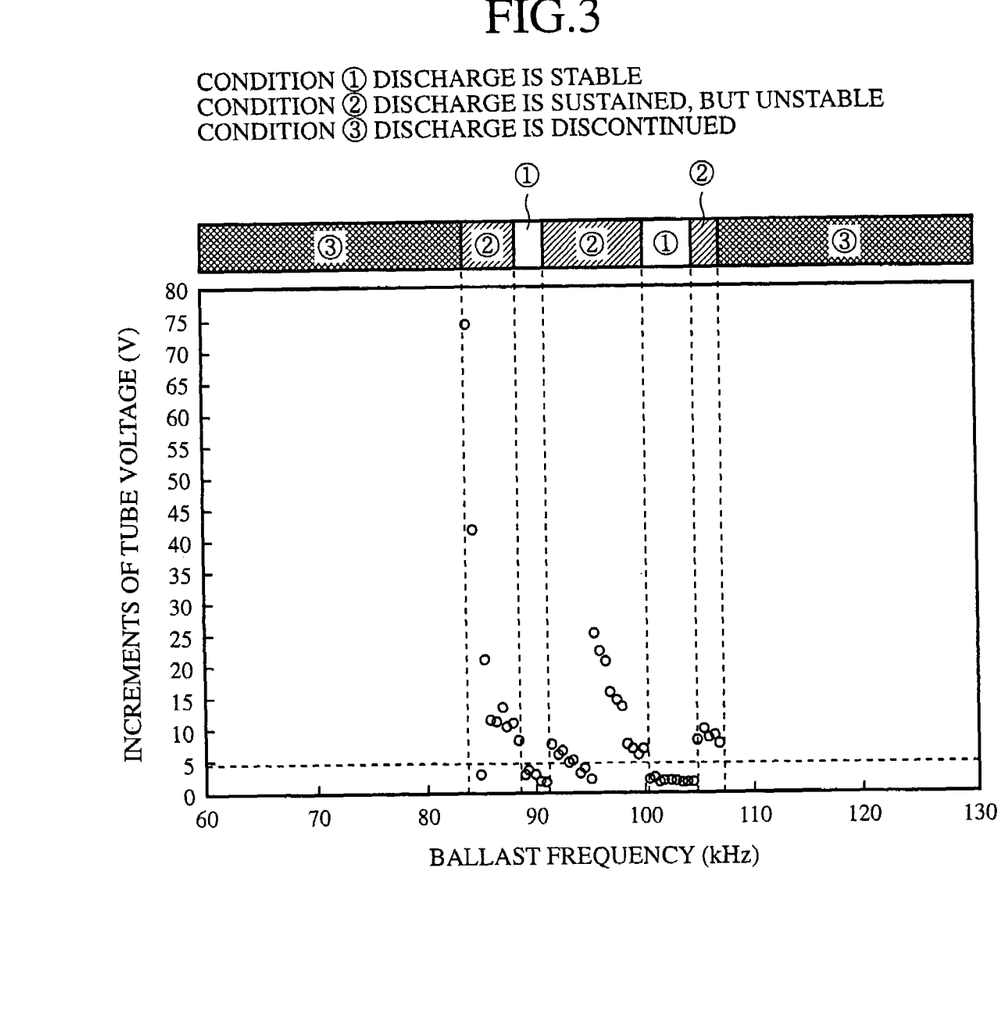
FIG. 3 is a diagram illustrating the ballast frequency and discharge conditions when the embodiment 1 of the high intensity discharge lamp ballast apparatus in accordance with the present invention does not use a frequency swept waveform.

FIG. 3 illustrates increments of the tube voltage at individual frequencies from 60 kHz to 130 kHz for the frequency fixed waveform (that is, without the frequency sweep), and the observed results obtained by visual inspection of the discharge conditions. The increments of the tube voltage indicate quantitative estimates of the instability of the discharge, whereas the visual inspection of the discharge conditions represents qualitative estimates of the instability of the discharge. It is known that the unstable arc discharge increases the tube voltage.

The tube voltages as illustrated in FIG. 3 are each obtained by holding the positive peak voltage applied across the electrodes at the ends of the lamp at a time constant of 100 times the period. The increments of the tube voltage represent the difference between the maximum value and the minimum value for the temporal fluctuations in the tube voltage. In other words, large increments of the voltage represent large voltage fluctuations, which in turn indicates large instability of the discharge. The HID lamp used for the measurements is a Philips' D2R with rated values 85 V and 35 W.

In FIG. 3, the discharge is extinguished in a few seconds from the breakdown in the frequency bands less than 85 kHz and above 108 kHz (condition ③). In these bands, the discharge is considered to be extinguished because of the acoustic resonance. In the frequency bands of 85–88 kHz, 92–101 kHz and 106–108 kHz, although the discharge is sustained, the shape of the arc discharge changes incessantly, and is unstable (condition ②). In these frequency bands, mild acoustic resonance is considered to occur. Thus, the discharge in the conditions ② and ③ cannot be used for the ballast. In contrast, in the range 88–92 kHz and 101–106 kHz, the discharge becomes straight and is stable (condition ①). Only the discharge in these bands can be utilized for the ballast, but the frequency bands are very narrow.

When the available frequency band is narrow, the stable discharge frequency can deviate because of the differences of the makers or of the individual differences in the lamps. In other words, a common frequency band that stabilizes the discharge of all the lamps is not present. To extend the available frequency band, the frequency sweep scheme is used which modulates the ballast frequency. The reason for this will be described next.

Figure 4:
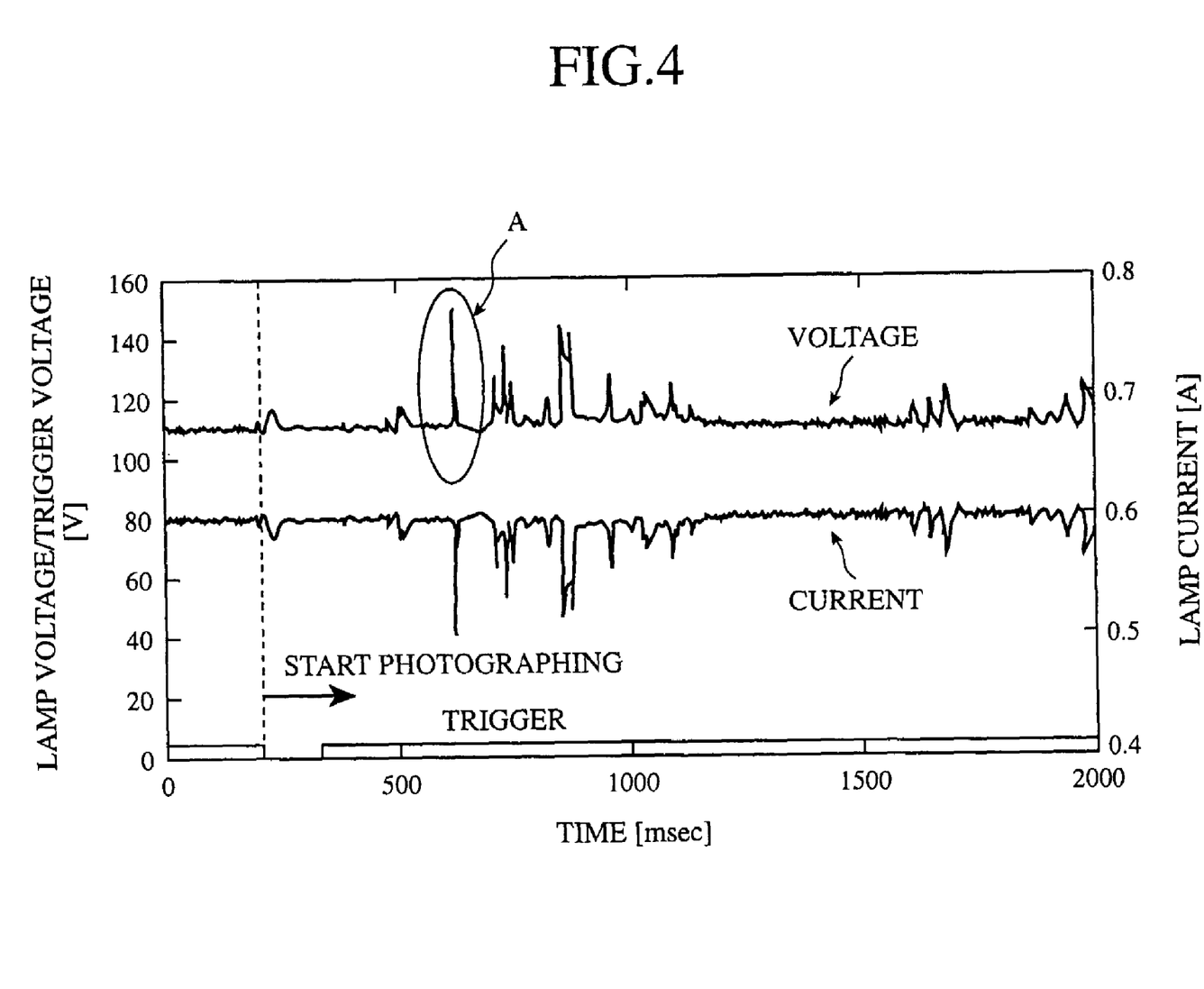
FIG. 4 is a diagram illustrating variations in the lamp tube voltage and current versus time at the ballast frequency of 84.5 kHz in the embodiment 1 of the high intensity discharge lamp ballast apparatus in accordance with the present invention.
Figure 5:
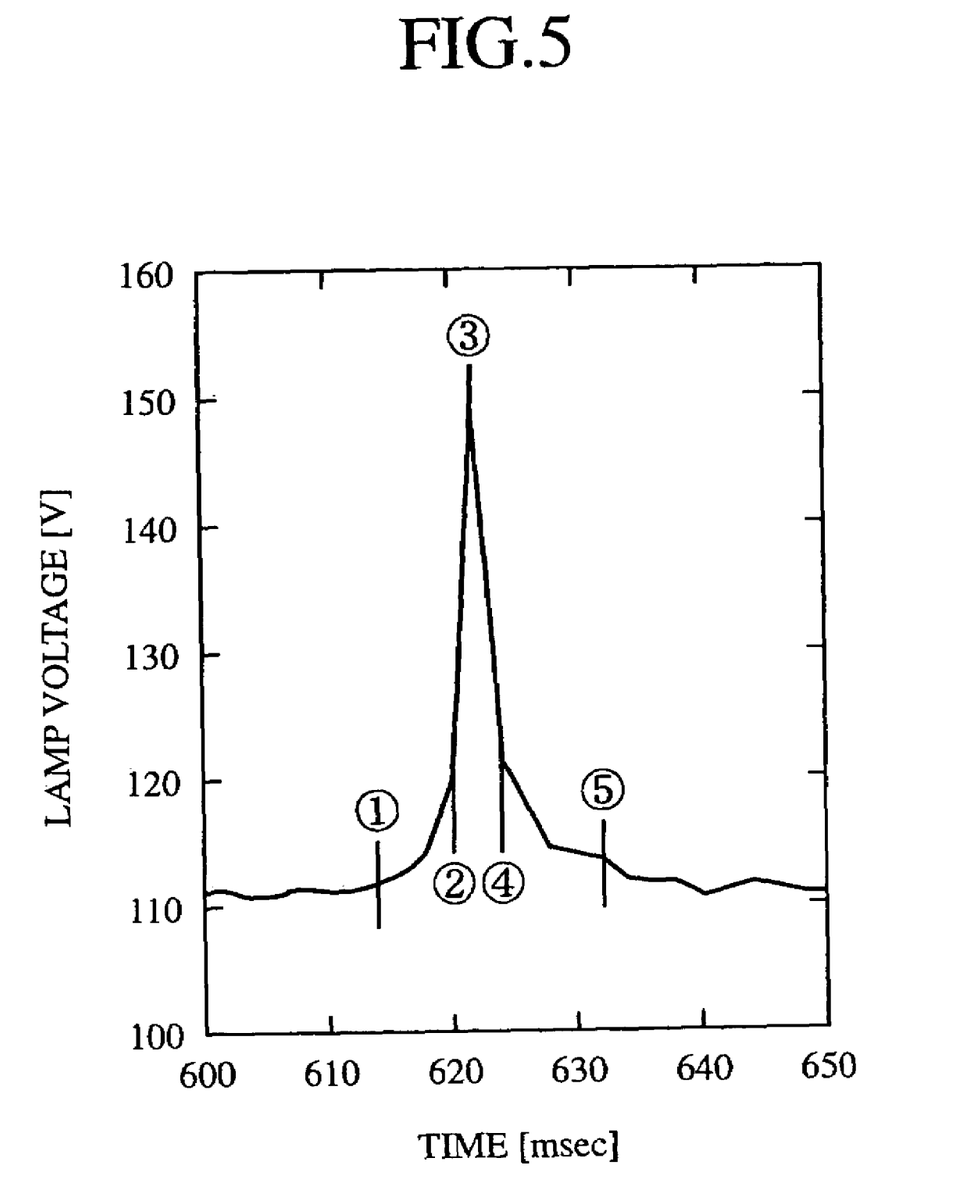
FIG. 5 is an enlarged diagram of the portion A of FIG. 4.
Figure 6:
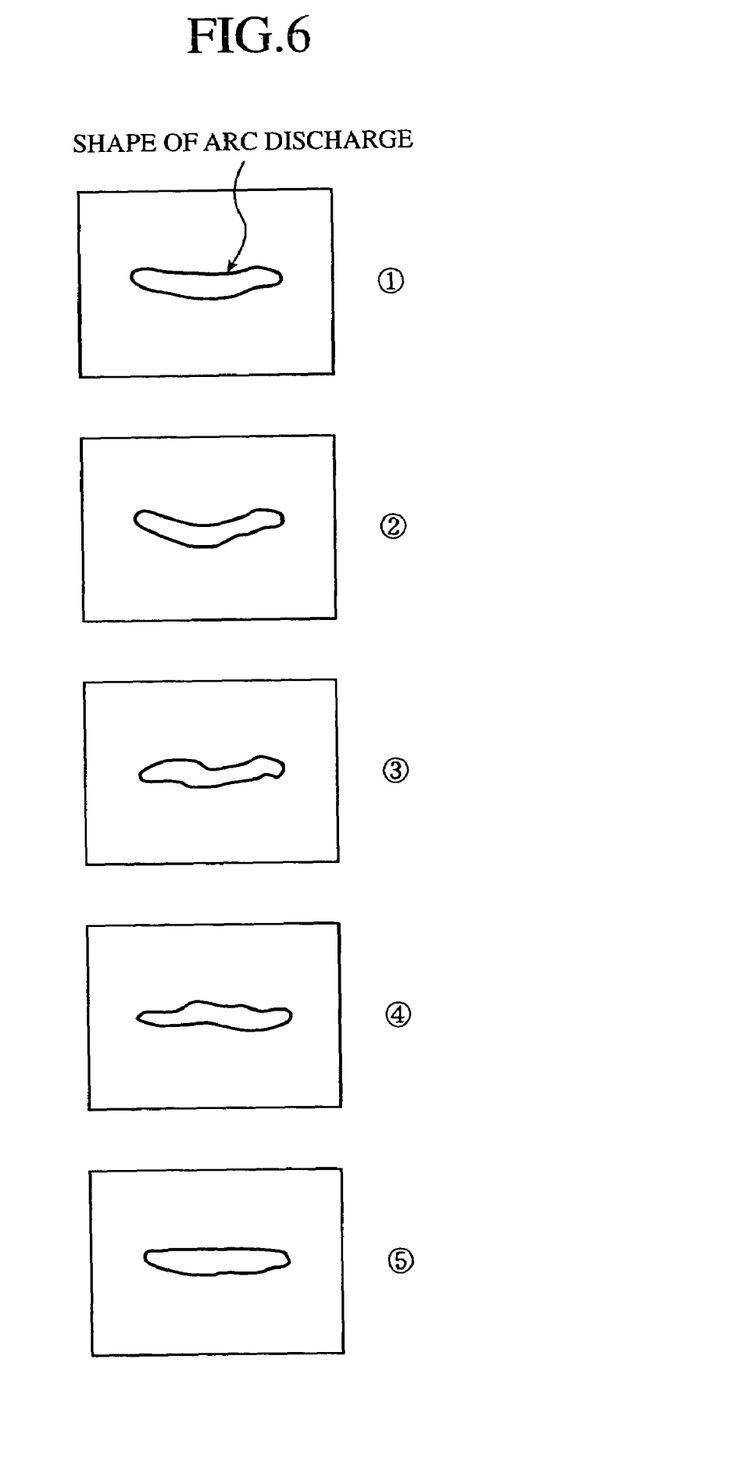
FIG. 6 is a diagram illustrating shapes of the arc discharge corresponding to discharge locations of FIG. 5.

FIGS. 4–6 illustrate the details of the variations in the tube voltage and the shapes of the arc discharge. The frequency in this case is 84.5 kHz at which the arc shape varies sharply. The shapes of the arc discharge as illustrated in FIG. 6 were taken by a high-speed video camera after they were enlarged and projected on a screen upside down through a projection lens. The numbers assigned to the tube voltage variations with respect to time as illustrated in the enlarged diagram of FIG. 5 correspond to the numbers of the shapes of the arc discharge of FIG. 6.

It is seen from these figures that although the arc discharge is straight and stable when the tube voltage is low, the arc shapes bend and vary as the voltage increases. The results not only confirms the previously known correlation between the tube voltage and the instability of the discharge due to the acoustic resonance, but also a new fact that the time taken by the arc discharge to shift from the stable condition to the unstable condition (the time from ① to ③ in FIG. 5) is about 10 msec. In other words, the standing wave due to the acoustic resonance takes about 10 msec to develop, and hence its development can be prevented unless the fixed frequency is continued for 10 msec or more. The results can be obtained for the first time by improving the sampling accuracy of the tube voltage with respect to time. No measurement results with such high accuracy have been known previously.

Figure 7:
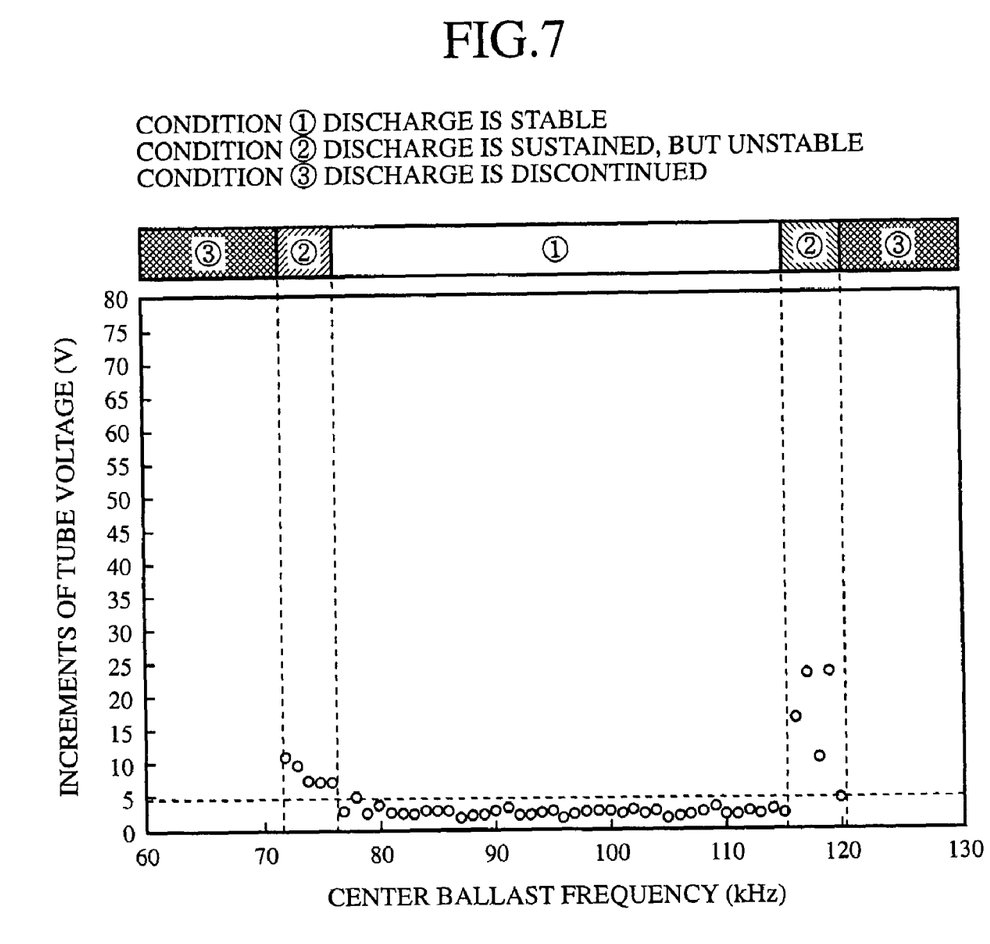
FIG. 7 is a diagram illustrating the ballast frequency and discharge conditions when the embodiment 1 of the high intensity discharge lamp ballast apparatus in accordance with the present invention uses a frequency swept waveform.

Considering the foregoing experimental results, a specified frequency swept waveform is used as a waveform for preventing the fixed frequency from being continued for 10 msec or more. The frequency swept waveform is swayed by ±10 kHz from a particular center frequency with a modulation frequency of 1 kHz. FIG. 7 illustrates the relationships between the center frequency and the increment of the tube voltage. Compared with the case of FIG. 3 that does not use the frequency sweep, it is found that the stable discharge band (condition ①) is extended. In other words, it shows that the frequency margin is increased, thereby being able to absorb the differences depending on the maker or the individual differences of the lamps.

Incidentally, the frequency sweep ballast system cannot achieve the stable discharge at all the frequencies in the limited frequency band from 60 kHz to 130 kHz. The reason for this is considered that the frequency sweep ballast must have, near that frequency, a stable frequency for carrying out the fixed frequency ballast.

In addition, some lamps may not have a stable band above the frequency 80 kHz. In this case, it is difficult even for the sweep ballast system to achieve the stable discharge.

Furthermore, the frequency at which the discharge instability due to the acoustic resonance occurs can vary depending on the acoustic waves in the tube. In other words, the frequency can vary depending on the pressure and temperature in the tube. Thus, a configuration is also possible in which the power control circuit 6b controls the power to be supplied to the lamp around the rated power in order to form a stable band in the foregoing band.

EMBODIMENT 2

Figure 8:
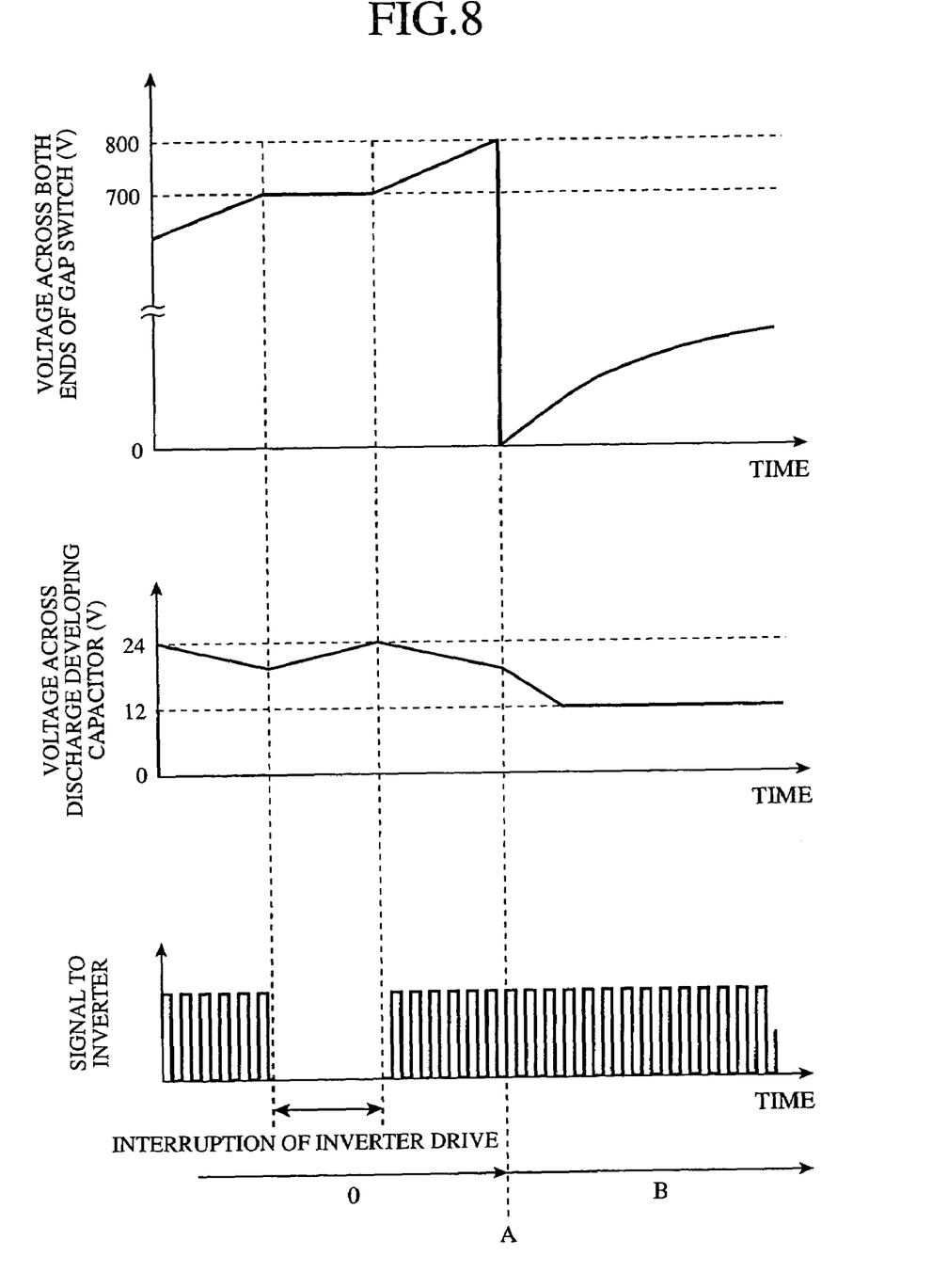
FIG. 8 is a diagram illustrating the relationships between the voltage across a gap switch on the secondary side, the voltage across the discharge developing capacitor on the primary side, and a signal fed to the inverter of an embodiment 2 of the high intensity discharge lamp ballast apparatus in accordance with the present invention.

Next, the embodiment 2 of the high intensity discharge lamp ballast apparatus will be described with reference to FIG. 8. The embodiment 2 relates to a ballast method for reducing the capacity Ca of the discharge developing capacitor 2a. FIG. 8 illustrates the voltage across the gap switch 5e on the secondary side of FIG. 1, the voltage across the discharge developing capacitor 2a on the primary side, and the signal fed to the inverter. In the following description, FIGS. 1–7 and their description in the embodiment 1 will be referred to where appropriate.

The discharge developing capacitor 2a must store, in addition to the energy supplied to the lamp during the discharge developing period, the energy necessary for increasing up to the voltage enabling the gap switch 5e to turn on. The energy Wg required to increase up to the turn-on voltage Vg of the gap switch 5e is given by the following expression.

$$Wg = \frac{1}{2} \cdot Cg \cdot Vg^2 \quad (1)$$

where Cg is the capacity of the gap switch activating capacitor 5d connected in parallel with the gap switch 5e. Then, the capacity Ca needed to store the energy Wg in the discharge developing capacitor 2a on the primary side is given by the following expression.

$$Ca = Cg \cdot Vg^2 / Va^2 \quad (2)$$

where Va is the voltage of the primary side. The present embodiment 2 related to a ballast method capable of reducing the capacity Ca.

When the switching elements 4a and 4b repeat turning on and off during the discharge preparatory period, the gap switch activating capacitor 5d is charged and its voltage increases gradually. In this case, to charge the capacitor 5d, the discharge developing capacitor 2a is discharged. When the capacitor 5d is charged to the potential of 0.9·Vg, the driving of the inverter is stopped to recharge the discharge developing capacitor 2a. When the discharge developing capacitor 2a is fully charged, the driving of the inverter is restarted. Thus, the potential of the capacitor 5d for the gap switch increases again, and when it reaches Vg, the gap switch 5e is turned on.

According to the ballast method, the energy required to increase to Vg can be reduced as follows.

$$Wg = \frac{1}{2} \cdot Cg \cdot (Vg^2 - (0.9 \cdot Vg)^2) \quad (3)$$

Accordingly, the capacity Ca required for storing the energy by the discharge developing capacitor 2a on the primary side is given by the following expression.

$$Ca = Cg \cdot 0.19 \cdot Vg^2 / Va^2 \quad (4)$$

Accordingly, the present embodiment 2 can reduce the capacity of the discharge developing capacitor 2a by that amount.

Although the voltage Vgs across the gap switch 5e for stopping the inverter is assumed to be 0.9 Vg above, it is seen from equation (4) that the capacity of the discharge developing capacitor 2a can be reduced by making Vgs as closer to Vg as possible. The coefficient to be multiplied by Vgs is determined considering the variations in the gap switch 5e.

Although the present embodiment 2 has only one recharge period of the discharge developing capacitor 2a during the charging of the capacitor 5d for operating the gap switch, the recharge period can be provided twice or more. This makes it possible to further reduce the capacity of the discharge developing capacitor 2a.

What is claimed is:

1. A high intensity discharge lamp ballast apparatus comprising:
    a transformer;
    a plurality of power supplies provided on a primary side of said transformer, wherein one of said plurality of power supplies is a DC power supply, and another of said plurality of power supplies is a discharge developing capacitor connected in parallel with said DC power supply;
    a booster circuit for increasing a voltage across said discharge developing capacitor beyond the voltage of said DC power supply;
    a plurality of switching elements provided on the primary side of said transformer; and
    a control circuit for turning said plurality of switching elements on and off repeatedly to generate, on a secondary side of said transformer, an AC voltage that is higher in voltage and frequency than a primary side voltage of said transformer.

2. The high intensity discharge lamp ballast apparatus according to claim 1, further comprising a reverse blocking diode connected between said booster circuit and said discharge developing capacitor.

3. The high intensity discharge lamp ballast apparatus according to claim 1, further comprising a synchronous rectification switching element connected between said discharge developing capacitor and said DC power supply.

4. A high intensity discharge lamp ballast apparatus comprising:
    a transformer;
    a plurality of power supplies provided on a primary side of said transformer;
    a plurality of switching elements provided on the primary side of said transformer;
    a control circuit for turning said plurality of switching elements on and off repeatedly to generate, on a secondary side of said transformer, an AC voltage that is higher in voltage and frequency than a primary side voltage of said transformer; and
    a voltage multiplier circuit on the secondary side of said transformer, for increasing voltage across a gap switch activating capacitor, connected in parallel with a gap switch, beyond the voltage generated on the secondary side of said transformer.

5. A high intensity discharge lamp ballasting method comprising driving, during at least one of a discharge transient period and a normal discharge period after a breakdown, a high intensity discharge lamp with a frequency modulated driving voltage having a center frequency in a range from 80 kHz to 120 kHz.

6. A high intensity discharge lamp ballasting method comprising:
    producing a desired voltage across a discharge developing capacitor connected in parallel with a DC power supply, on a primary side of a transformer, by charging said discharge developing capacitor;
    charging a gap switch activating capacitor connected to a secondary side of said transformer to a turn-on voltage of a gap switch by repeatedly turning on and off a plurality of switching elements located on the primary side of said transformer;
    generating a breakdown in a high intensity discharge lamp by supplying said high intensity discharge lamp with a counter electromotive force of a pulse voltage generated by turning on said gap switch;

starting luminous flux after the breakdown by increasing power supplied to said high intensity discharge lamp beyond rated power by applying energy from said discharge developing capacitor to said high intensity discharge lamp, and by controlling a duty factor of waveforms for driving said switching elements; and maintaining power supplied to said high intensity discharge lamp at the rated power after the start-up of the luminous flux by controlling the duty factor of the waveforms driving said switching elements.

7. The high intensity discharge lamp ballasting method according to claim 6, further comprising modulating the frequency of a driving voltage of said high intensity discharge lamp in at least one of a discharge developing period, a luminous flux start-up period, a normal discharge period, and a period from the discharge developing period to the normal discharge period.

8. The high intensity discharge lamp ballasting method according to claim 7, further comprising determining a modulation frequency, a minimum frequency, and a maximum frequency of the driving voltage from a voltage across said high intensity discharge lamp in a stable discharge condition to prevent the driving voltage from holding the same frequency for more than a predetermined time period during which the voltage across said high intensity discharge lamp begins to rise owing to an unstable discharge due to an acoustic resonance.

9. The high intensity discharge lamp ballasting method according to claim 8, further comprising determining the modulation frequency, the minimum frequency, and the maximum frequency, such that the driving voltage does not hold the same frequency for a duration of at least 10 msec.

10. The high intensity discharge lamp ballasting method according to claim 6, further comprising during a discharge preparatory period:

charging the gap switch activating capacitor provided on the secondary side of said transformer to a voltage less than turn-on voltage of the gap switch by turning the plurality of switching elements on and off repeatedly;

holding the voltage across the gap switch activating capacitor by turning off the switching elements after the charge, and charging the discharge developing capacitor to a predetermined voltage from the DC power supply; and charging the gap switch activating capacitor to the turn-on voltage of the gap switch by turning the plurality of switching elements on and off repeatedly after the charging of the discharge developing capacitor.

11. The high intensity discharge lamp ballasting method according to claim 5, further comprising determining a modulation frequency, a minimum frequency, and a maximum frequency of the driving voltage from a voltage across said high intensity discharge lamp in a stable discharge condition to prevent the driving voltage from holding the same frequency for more than a predetermined time period during which the voltage across said high intensity discharge lamp begins to rise owing to an unstable discharge due to an acoustic resonance.

12. The high intensity discharge lamp ballasting method according to claim 11, further comprising determining the modulation frequency, the minimum frequency, and the maximum frequency, such that the driving voltage does not hold the same frequency for a duration of at least 10 msec.

* * * * *